United States Patent [19]

Guslits et al.

[11] Patent Number: 4,840,259

[45] Date of Patent: Jun. 20, 1989

[54] DRIVE MECHANISM FOR A REPRODUCTION APPARATUS

[75] Inventors: Vladimir S. Guslits; Steven P. Bailey, both of Rochester, N.Y.

[73] Assignee: Eastman Kodak Company, Rochester, N.Y.

[21] Appl. No.: 128,313

[22] Filed: Dec. 3, 1987

[51] Int. Cl.$^4$ .................. F16D 7/02; F16D 11/00; F16D 13/08; F16D 21/08

[52] U.S. Cl. .................. 192/48.2; 192/48.5; 192/81 C; 192/84 T; 192/108; 355/133; 464/46

[58] Field of Search .............. 192/48.2, 48.5, 84 T, 192/81 C, 108, 67 R; 355/133; 464/46, 102, 104

[56] References Cited

U.S. PATENT DOCUMENTS

| | | | |
|---|---|---|---|
| 3,073,180 | 1/1963 | Lohr | 192/48.2 X |
| 3,815,380 | 6/1974 | Esmay | 355/8 X |
| 4,128,079 | 12/1978 | Suzuki | 118/658 |
| 4,321,992 | 3/1982 | Gallo | 192/81 C |
| 4,449,809 | 5/1984 | Tamura | 355/3 DR |
| 4,548,491 | 10/1985 | Eiland | 355/3 R |
| 4,570,768 | 2/1986 | Nishimura et al. | 192/84 T X |
| 4,607,734 | 8/1986 | Watashi et al. | 192/67 R |
| 4,615,605 | 10/1986 | Kida | 355/3 R |
| 4,630,722 | 12/1986 | Figueira et al. | 192/81 C X |

Primary Examiner—Rodney H. Bonck
Attorney, Agent, or Firm—Leonard W. Treash

[57] ABSTRACT

A drive mechanism rotates a shaft of a station of a reproduction apparatus about an axis. The drive mechanism is supported by a mechanism plate in the apparatus, and the station is movable in a direction substantially parallel to the axis to engage the shaft with the drive mechanism and to disengage the shaft from the drive mechanism. Power from a source can be applied to the drive mechanism when the station shaft is disengaged from the mechanism, when the shaft is engaged with the mechanism but the station is not being operated, and when the station is being operated. The improved drive mechanism is particularly useful for one or more development stations of a reproduction apparatus such as a copier/duplicator, printer or the like.

2 Claims, 3 Drawing Sheets

DRIVE MECHANISM FOR A REPRODUCTION APPARATUS

BACKGROUND OF THE INVENTION

The present invention relates to an improved mechanism for driving a shaft of a station of a reproduction apparatus, such as a shaft of one or more development stations of an electrographic copier/duplicator or printer.

It is known to bolt a drive mechanism for a shaft of a development station to a mechanism plate near the rear of a reproduction apparatus, such as a copier/duplicator. Power is applied to the station from the back side of the mechanism plate through a gear or sprocket. A development station is located at the front side of the mechanism plate, and it is moved on guides into and out of engagement with the drive mechanism. As the development station is moved toward the drive mechanism from the front side of the plate a shaft of the station passes through an opening in the plate and enters a clutch of the drive mechanism. Guides mount the station in the apparatus so that the station moves in a direction substantially parallel to the axis of the shaft to engage the shaft with the drive mechanism and disengage the shaft from the drive mechanism.

Some reproduction apparatus have two or more development stations for applying toners of different colors to latent images to produce copies in one or more colors of an original document. When the apparatus has two development stations, one station typically has developer material comprising black toner particles and the other development station has development material comprising another color toner particles, such as red, green, blue, etc. Sometimes four development stations are provided with one station furnishing black toner particles to the latent image and the other stations furnishing cyan, magenta, and yellow toner particles to a latent image to provide full process color reproductions of the original document.

When more than one development station is provided in a reproduction apparatus, there may be times when only one of the stations is to be operated. For example, reproduction of a black original solely with black toner particles would require operation of only one development station. Thus, while the black station is operating any other station needs to be at idle or rest. Such can be easily accomplished by providing separate motor and drives for each development station. However, separate drives increases the cost of the apparatus and requires a significant amount of space in the reproduction apparatus. Also, when the reproduction apparatus has provision for two or more development stations, one station may be in place and operable at a time when another station has been removed from the apparatus. If a common drive for all development stations is used, then the drive for the removed station may be driven from a power source even when the station is not present in the machine. Thus there is a need for an improved drive mechanism for development stations of reproduction apparatus which are operable under each of three conditions of operation, i.e., when the station is loaded in the copier and the station is running, when two stations are loaded in the copier and one station is being operated while another is at rest or not running, and when the station is removed from the copier but the mechanism is driven as part of a drive for another development station in the copier.

Another problem with drive mechanisms for development stations of reproduction apparatus is a direct coupling between a power source and a driven shaft of the station can cause surges of torque to be applied directly to the shaft each time the power source is cycled on or off, either directly or through a clutch in the drive mechanism. Such a surge of torque can create maintenance and repair problems and, accordingly, it is desirable to provide a mechanism for controlling torque surges directly to the shaft of the development station.

SUMMARY OF THE INVENTION

An object of the present invention is to provide a drive mechanism for a development station of a reproduction apparatus capable of operating when the station is loaded in the apparatus and the station is running, when the station is loaded in the apparatus but at rest while another station is being operated, and when the station is removed from the apparatus but the mechanism continues to be driven. Another object of the invention is to provide a mechanism for driving a development station for reproduction apparatus in which surges of torque to the drive shaft of the station are controlled.

The present invention is useful in a reproduction apparatus having a station with a shaft rotatable about an axis, a drive mechanism for rotating the shaft, a plate supporting the drive mechanism, and wherein the station shaft is movable into and out of engagement with the drive mechanism. The drive mechanism of the invention includes a coupling having an opening generally aligned with the axis of the shaft for receiving the shaft. The coupling has means for connecting the coupling to the shaft for conjoint movement. A rotor is positioned around the coupling, and the rotor is mounted on the coupling for rotation relative to the coupling. Means are provided for rotating the rotor relative to the coupling. A clutch is supported by the plate and positioned between the rotor and the coupling. The clutch is effective when energized to couple the rotor to the coupling for conjoint rotation, and the clutch is effective when deenergized to permit the rotor to rotate relative to the coupling. Means are provided for mounting the rotor relative to the clutch so that the rotor can rotate freely when the clutch is deenergized.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
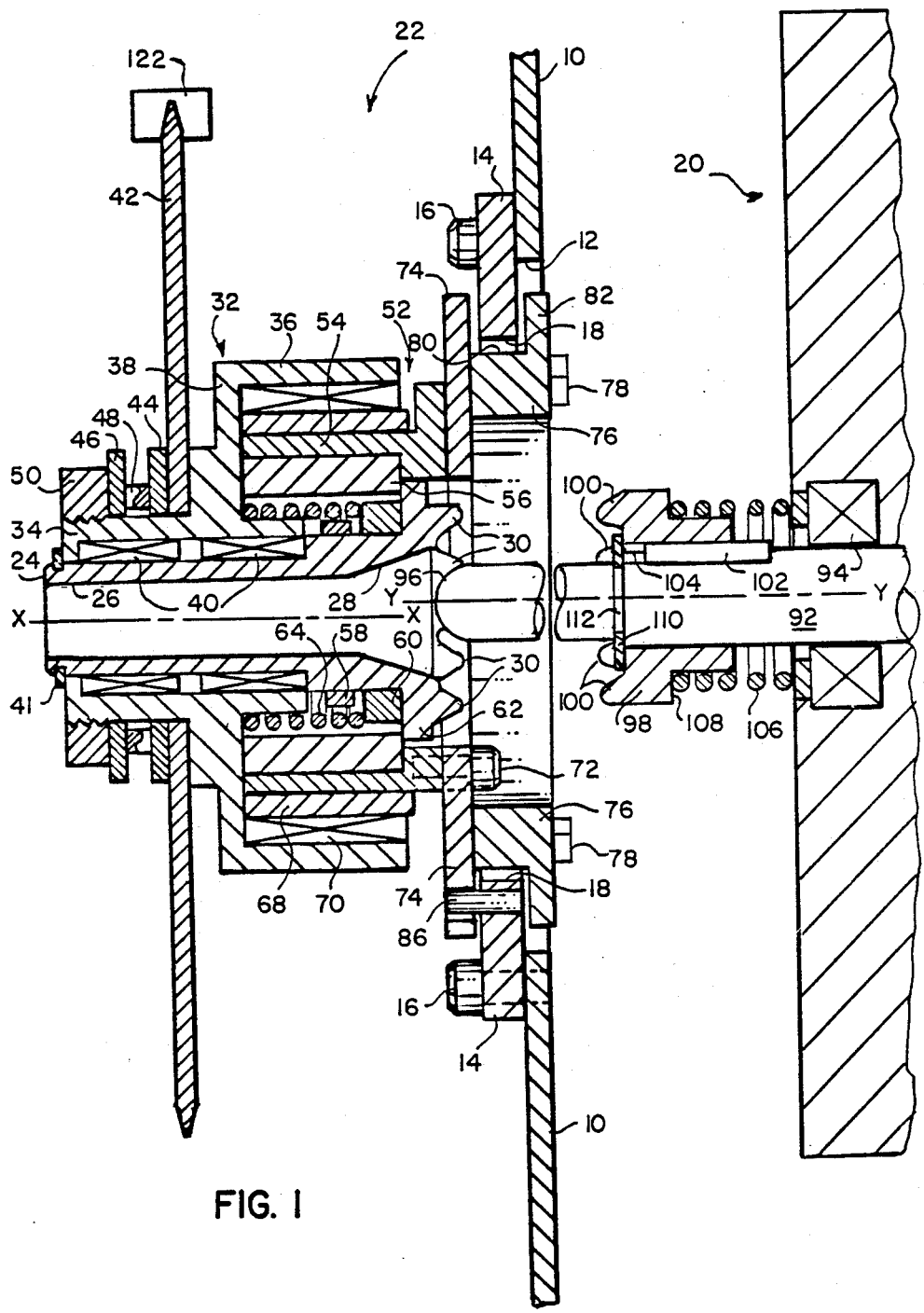
FIG. 1 is a cross section view showing a preferred embodiment of an improved drive mechanism of the invention and illustrating a fragmentary portion of a development station of an electrographic apparatus adjacent but disengaged from the drive mechanism.

Referring now to the drawings, a fixed mechanism plate 10 is located near the back of a copier/duplicator, printer or other reproduction apparatus. The plate has an opening 12 therein, and a mounting member 14 for the drive mechanism of the invention is secured to the mechanism plate 10 by bolts 16. A circular opening 18 in the mounting member 14 is substantially aligned with the axis of the driven shaft of a development station generally designated 20 and described in more detail later.

The drive mechanism for development station 20 is generally designated 22 and includes an elongate coupling 24 having a cylindrical opening 26 that receives the shaft of station 20. Coupling 24 can be rotated about the axes X—X of opening 26. The end of opening 26 nearest station 20 has a frusto-conical surface 28 that flares outwardly to the right end of the coupling. As explained in more detail later, the shaft of station 20 enters the right end of the coupling and is guided into the coupling by the surface 28.

Coupling 24 also has on the right end thereof an annular array of gear teeth 30 that surround surface 28 and are spaced from the opening defined by surface 28. These teeth are used for connecting the coupling to the shaft of station 20 as explained later.

A rotor generally designated 32 is positioned around coupling 24. The rotor is generally annular in shape and includes two axially extended portions 34 and 36 connected by a radially extending portion 38. The radially inner portion 34 of the rotor is mounted for rotation about the coupling 24 by bearings 40. The bearings are located between shoulders on the coupling and the rotor. A retainer 41 fits in a groove in the left end portion of the coupling 24 and prevents axial movement of the rotor portion 34 to the left from the position illustrated in the drawings.

A sprocket 42 bears against the left side of the radially extending portion 38 of the rotor. Two annular disks 44 and 46 also are positioned around portion 34 of the rotor, and disk 44 is located against the sprocket 42 on the side opposite from the rotor 32. A spring washer 48 is located between the disks 44 and 46. The washer 48 has a wavy or undulating configuration so that alternate curved portions of the washer bear against disk 48 and disk 46. A nut 50 is threaded onto the axial end portion of the rotor portion 34 and engages disk 46. Adjustment of the nut 50 relative to disk 46 adjusts the pressure exerted by the spring 48 against disk 44. This in turn adjusts the compression forces between disk 44, sprocket 42 and portion 38 of the rotor.

Disks 44, 46, spring 48 and nut 50 provide an adjustable friction coupling between sprocket 42 and the rotor. Thus by adjustment of the nut 50 the friction between the sprocket and the rotor can be controlled to obtain some limited slippage therebetween in the event the drive sprocket 42 is driven with a predetermined high force that exceeds the mount of torque that can be safely applied to the station 20 without adversely affecting the station.

A clutch generally designated 52 is positioned between rotor 32 and coupling 24. The clutch is effective to couple the rotor to the coupling for conjoint rotation or to disengage the coupling from the rotor to permit the rotor to rotate relative to the coupling.

The clutch 52 illustrated in the drawings is similar to a conventional radial electric spring clutch. Clutch 52 comprises an annular housing 54 that fits within the axially extending portion 36 of the rotor. Secured to the inner surface of housing 54 is an electromagnet 56. A pair of annular elements 58 and 60 are located radially within the electromagnet 56. Element 58 is secured to the outer surface of coupling 24 while element 60 is free to move in an axial direction between the element 58 and a shoulder 62 on the coupling. A wire coil spring 64 also is located inside the electromagnet 56 and has its ends secured to the annular element 60 and to the radially extending portion 38 of the rotor 32. The outside diameter of element 58 is smaller than the outside diameter of element 60, and normally the spring fits loosely over element 58 as shown in the drawings.

When the rotor 32 is rotated the spring 64 and annular element 60 rotate with it. When the electromagnet 56 is energized, magnetic forces produced by the magnet bring the annular element 60 against shoulder 62 to temporarily stop rotation of the element 60. Continued rotation of the rotor causes the wire spring 64 to tighten about the element 58 until the spring tightly grips the element 58, which is fixed on coupling 24. In this manner the spring is effective to couple the rotor 32 to element 58 and thus to the coupling 24 so that the coupling can be rotated by the rotor and by the sprocket 42.

An annular bearing support 68 is positioned around the clutch housing 54. Needle bearings 70 are provided between bearing support 68 and the axially extending portion 36 of the rotor so that the rotor can rotate freely with respect to the clutch when the clutch is deenergized.

Housing 54 of the clutch 52 is secured by screws 72 to a mounting plate 74. Plate 74 is annular in shape and surrounds the right end of coupling 24. Plate 74, in turn, is connected to a ring 76 by bolts 78. Ring 76 has an outer annular surface 80 that fits loosely within the opening 18 in mounting member 14. Surface 80 is somewhat smaller than the opening 18 so that the ring if free to move in a radial direction with respect to opening 18. A flange 82 of the ring projects above surface 80 on the side edge thereof opposite from the plate 74 so that the ring surface 80, flange 82 and plate 74 define a space of generally U-shaped cross section that accommodates the radially inner portion of the mounting member 14. The space between opening 18 of the mounting member 14 and the annular surface 80 of the ring allows vertical adjustment of the axes X—X of the coupling 24 to accommodate the shaft of the station 20 as explained in more detail later. The space between mounting member 14 and the plate 74 and flange 82 allows some tilting of the coupling 24 to accommodate any skew of the coupling with respect to the shaft of the station 20 as explained in more detail later. The spacing between these parts is exaggerated in the drawing in order to better illustrate the relationship.

The plate 74 and ring 76 could be located so that surface 80 is adjacent opening 12 in plate 10 and thus eliminate member 14. However, the use of member 14 enables the drive mechanism 22 including member 22 to be assembled as a unit and conveniently mounted on plate 10 from the back side only of plate 10, thus facilitating final assembly of the drive mechanism in the reproduction apparatus.

Figure 3:
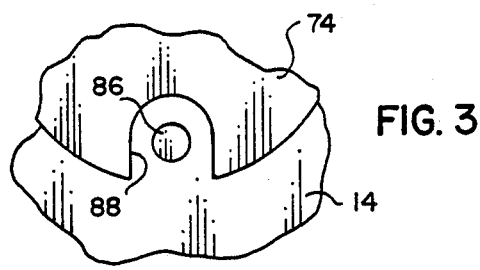
FIG. 3 is a schematic view in elevation illustrating a detail of the drive mechanism.

Clutch housing 54 needs to be held stationary with respect to the mounting member 14 and mechanism plate 10. In order to prevent rotation of the clutch housing, a pin 86 is provided on mounting member 14. The pin projects into a notch 88, best shown in FIG. 3, formed in a side edge of the plate 74. The loose fit between the pin 86 and the portion of the plate defining the notch 88 permits vertical movement of the plate as may be necessary during movement of the coupling 24 to accommodate the shaft of the development station.

Station 20 comprises a housing 90 and a shaft 92 projects from the housing. The shaft 92 is rotated to operate the station. Shaft 92 is mounted in bearings 94 for rotation about an axes Y—Y. The station is mounted for movement in a direction substantially parallel to axes Y—Y toward and away from the drive 22 with the axes Y—Y being generally aligned with the axes X—X of the coupling 24. The outermost end 96 of the shaft is spherical in shape to facilitate entry of the shaft into the portions 26 and 28 of the coupling.

A gear 98 is positioned around shaft 92 and has a plurality of gear teeth 100 arranged in an annular array so that they can mesh with the teeth 30 on the right end of the coupling 24. A key 102 fits in a key way 104 formed in the shaft 92 and the gear 98 so that the gear and shaft are rotatable together. This mounting enables the gear 98 to be moved in an axial direction between the two positions illustrated in FIGS. 1 and 2. A spring 106 is positioned around shaft 92. The spring is compressed between housing 90 and a shoulder 108 on the gear to urge the gear to the left as viewed in the drawings. An annular retainer 110 seated in a groove 112 in the shaft is engageable by the left end of the gear 98 in order to limit movement of the gear to the left as viewed in the drawings.

As station 20 is moved toward the drive 22, from right to left as viewed in FIG. 1, shaft 92 enters the coupling 24. If the axis Y—Y of shaft 92 is offset from axis X—X of drive 22, the spherical end 96 of the shaft engages the frusto-conical surface 28 of the coupling to deflect the coupling and the drive 22 to a position that brings the axis X—X into alignment with the axis Y—Y. As illustrated in FIG. 1, this is affected by upward movement of the drive 22, such being permitted by the spacing between the annular surface 80 of ring 76 and the opening 18 in the mounting member 14. While upward movement is required as viewed in FIG. 1, it will be understood that the annular space between surface 80 and opening 18 permits movement in other radial directions with respect to the axis X—X as required. In addition, the spacing between the flange 82 of member 76 and plate 74 relative to the mounting member 14 permits some tilting of the axis X—X to achieve the desired alignment between axes X—X and Y—Y.

As station 20 reaches its fully loaded position the teeth 100 on gear 98 become meshed with the teeth 30 on coupling 24. The teeth mesh before the shaft 92 is fully inserted into the cylindrical opening 26 of the coupling, thereby causing the gear 98 to move axially or to the right from its FIG. 1 position to its FIG. 2 position against the force of spring 106. In the event the outermost portions of teeth 100 and teeth 30 engage each other during loading of the station, gear 98 can move even further to the right from its FIG. 2 position until initial rotation of coupling 24 occurs, at which time the teeth 100 and 30 mesh and the gear 98 is driven by spring 106 to the left to its FIG. 2 position.

Figure 4:
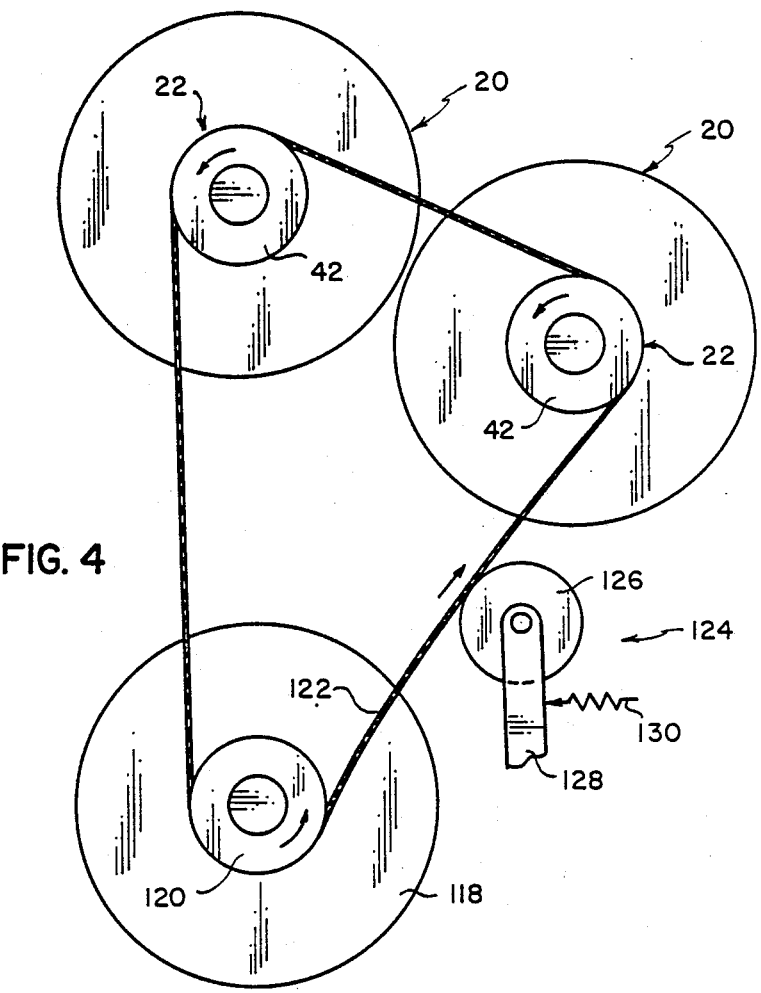
FIG. 4 is a schematic view, with parts omitted for clarity, showing two development stations and two drive mechanisms of the invention driven from a common power source.

FIG. 4 schematically illustrates an example of parts of a reproduction apparatus in which the present invention can be used. More specifically, the portion of the reproduction apparatus illustrated comprises two development stations 20, one of which might be used for providing black toner particles to latent images while the other development station might be used for providing toner particles of another color (such as red, green, or the like) to the latent images. Both stations 20 can be driven from a common drive, such as an electric motor 118. The output shaft of the motor is connected to a sprocket 120 which drives a chain 122 that is trained around the sprockets 42 of both development stations 20. The chain is held tight by a tensioning mechanism generally shown at 124 and comprising a roller or sprocket 126 that bears against a reach of the chain 122 between sprocket 120 and one of the development stations. Sprocket 126 is carried by a arm 128 and the sprocket is biased toward the chain by a spring 130.

Figure 2:
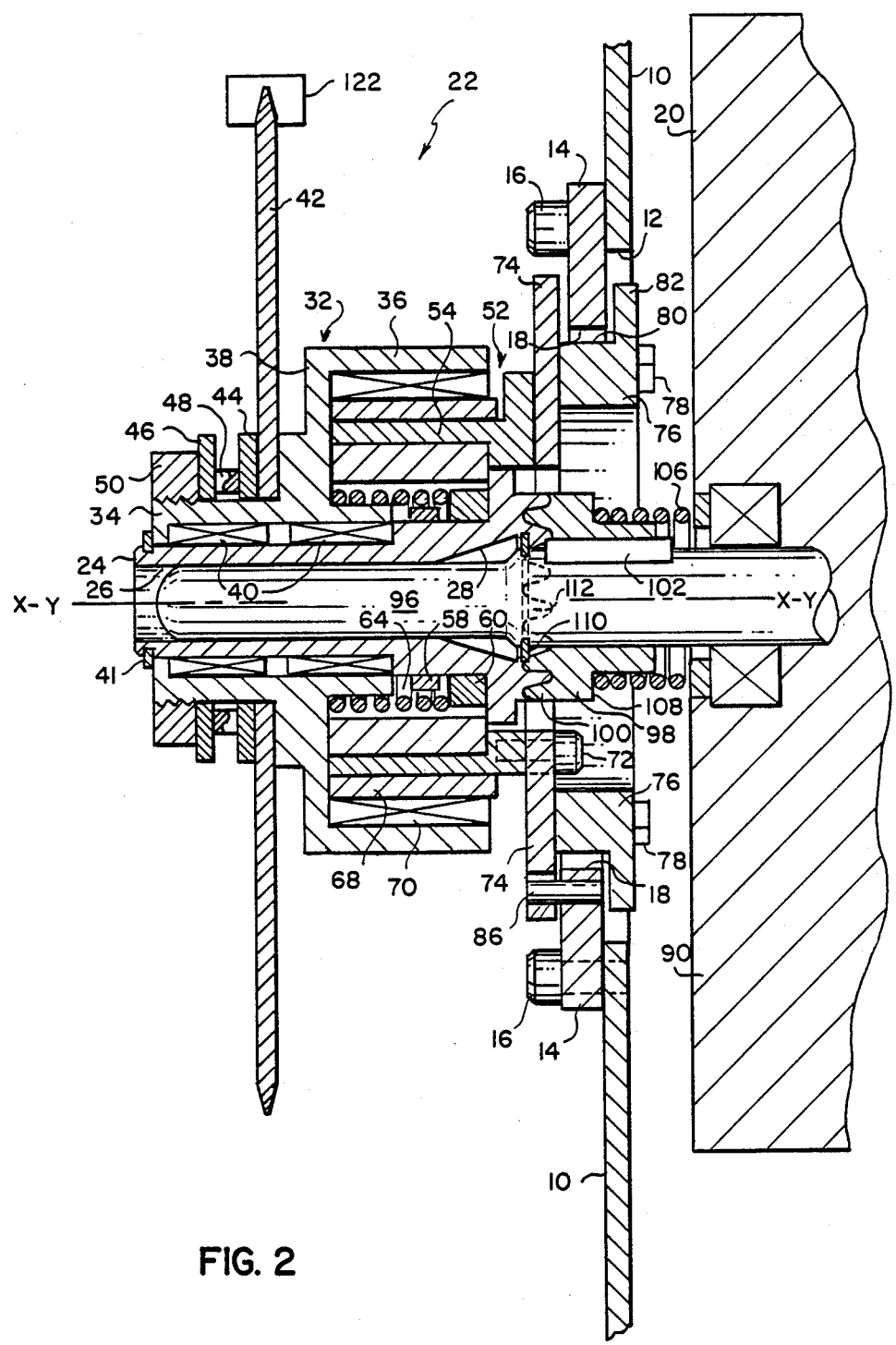
FIG. 2 is a view similar to FIG. 1 but illustrating the development station engaged with the drive mechanism of the invention.

In a reproduction apparatus having two development stations as shown in FIG. 4, the stations may be alternately operated when both stations are loaded in the machine in an operative position as shown in FIG. 2. Also, at times both stations might be operated simultaneously to apply toner particles to two latent images. At times one station can be operated while the other is removed from the apparatus. In other cases where, for example, four development stations are provided for full process color, the stations typically are all loaded in the machine and operated in a programmed sequence. The drive mechanism 22 must function properly in each of the several modes of operation.

When a station 20 is loaded in the reproduction apparatus in a position illustrated in FIG. 2 and the station is being operated, the clutch 52 is energized by providing current to the electromagnet 56. This causes spring 64 to tighten about the annular element 58 to couple the rotor 32 to the coupling 24. As a result rotation of sprocket 42 by chain 122 imparts rotation to the rotor 32, coupling 24 and through teeth 30 and 100 to the shaft 92 of station 20.

When the station is loaded in the reproduction apparatus but not operated while an adjacent station is being operated, clutch 52 is deenergized by shutting off the flow of electric current to the electromagnet 56. If sprocket 42 is rotated by chain 122, the rotor 32 rotates freely about bearings 40 and 70 without rotating the coupling 24. As a result, shaft 92 remains stationary. This condition can exist for a prolonged period of time without any adverse effect on the drive mechanism or the station because rotor 30 is fully supported by the bearings.

In the event one station 20 is removed from the reproduction apparatus and another station is operated, the drive mechanism 22 for the removed station can move downwardly relative to mechanism plate 10 and mounting member 14 in response to withdrawal of shaft 92 from the coupling 24. This downward movement is limited by the radial spacing between mounting member 14 and the annular member 76. The limited spacing between mounting member 14 and the flange 82 and plate 74 do not permit enough tilting of the drive mechanism 22 to interfere with its rotation by the chain 122. Chain 122 remains firmly in contact with the sprocket due to the tensioning device 124 (FIG. 4). Sprocket 42 can continue to be rotated even when the associated station is removed from the apparatus because the sprocket drives the rotor 32 which in turn is fully supported by bearings 40 and 70. At this time coupling 24 may also rotate with the rotor 32 since no part of the apparatus holds the coupling against rotation under these conditions. Thus bearings 70 are the primary support for rotation of rotor 32 when the station 20 is withdrawn from the drive mechanism.

A number of advantages are achieved by the drive mechanism of the present invention. First of all, the mechanism is operable in any of three modes of operation. More specifically, the drive mechanism can be driven when a station 20 is in the reproduction apparatus and being used for applying toner particles to a latent image. Also the drive mechanism can be operated when the station is in the reproduction apparatus but at rest or idle as, for example, when another station is being used to apply toner particles to latent images. In addition, the drive mechanism can be driven through the chain 122 even when the station has been withdrawn completely from the reproduction apparatus and another station is being used to apply toner particles to a latent image. Another advantage of the invention is that the torque applied through sprocket 42 can be adjusted by means of the nut 50 to avoid surges of excessive torque from being applied directly to the station drive shaft 92. Such torque surges are undesirable and may have an adverse effect on the station 20.

The invention has been described in detail with particular reference to a preferred embodiment thereof, but it will be understood that variations and modifications can be effected within the spirit and scope of the invention as described hereinabove and as defined in the appended claims.

We claim:

1. In a reproduction apparatus having a station with a shaft rotatable about an axis, a drive mechanism for rotating the shaft, a plate supporting the drive mechanism, and the station shaft being movable into and out of engagement with the drive mechanism, the drive mechanism comprising:

a coupling having an opening generally aligned with the axis of the shaft for receiving the shaft, the end of the opening facing the received shaft being of frusto-conical shape to accept a slightly misaligned shaft, the end of the coupling having gear teeth extending axially for connecting the coupling to the shaft for conjoint movement, a rotor positioned around the coupling, means mounting the rotor on the coupling for rotation relative to the coupling, means connected to the rotor for rotating the rotor relative to the coupling, a clutch supported by the plate and positioned between the rotor and the coupling, the clutch being effective when energized to couple the rotor to the coupling for conjoint rotation, and the clutch being effective when deenergized to permit the rotor to rotate relative to the coupling, means for mounting the rotor relative to the clutch so that the rotor can rotate freely when the clutch is deenergized, and means for supporting the drive mechanism permitting radial movement thereof relative to the plate to compensate for receipt of a misaligned shaft in the opening in the coupling.

2. The invention as set forth in claim 1 wherein the means for rotating the rotor comprises a sprocket, and means providing an adjustable friction connection between the sprocket and the rotor so that the sprocket can slip relative to the rotor when a predetermined high torque is applied to the sprocket.

* * * * *